US007019693B2

(12) United States Patent
Spirito (10) Patent No.: US 7,019,693 B2
(45) Date of Patent: Mar. 28, 2006

(54) ESTIMATING ALTITUDE OF A COMMUNICATIONS DEVICE (75) Inventor: Maurizio Spirito, San Bernardo d'Ivrea (IT)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/784,736

(22) Filed: Feb. 24, 2004

(65) Prior Publication Data
US 2005/0140548 A1 Jun. 30, 2005

(30) Foreign Application Priority Data
Dec. 29, 2003 (FI) .................... 20031913

(51) Int. Cl.
*G01S 3/02* (2006.01)
(52) U.S. Cl. .................................... 342/462
(58) Field of Classification Search ............... 342/120, 342/361, 367, 462
See application file for complete search history.

(56) References Cited
U.S. PATENT DOCUMENTS
6,061,018 A * 5/2000 Sheynblat ............ 342/357.06

6,614,382 B1 * 9/2003 Cannaday et al. ........ 342/26 R
6,735,542 B1 * 5/2004 Burgett et al. ................ 702/85
6,741,203 B1 * 5/2004 Woodell ..................... 342/120
6,756,938 B1 * 6/2004 Zhao et al. ............. 342/357.09
2003/0006930 A1 * 1/2003 Lodwig et al. ............. 342/120

OTHER PUBLICATIONS
3GPP, Digital Cellular Telecommunications System (Phase 2+); Universal Mobile Telecommunications System (UMTS); Universal Geographical Area Description (GAD) (3GPP TS 23.032, version 4.1.1, Release 4) ETSI TS 123 032, V4.1.(Jan. 2003).

* cited by examiner

*Primary Examiner*—Dao Phan
(74) *Attorney, Agent, or Firm*—Squire, Sanders & Dempsey, L.L.P.

(57) ABSTRACT

The altitude of a communications device, which communicates with a communications system via at least one antenna, is estimated. The altitude estimation is based at least on altitude information of said at least one antenna. The altitude estimate of the communications device may be based on a two-dimensional location estimate for the communications device and on information representing three-dimensional location of said at least one antenna of said communication system. The two-dimensional location estimate and the altitude estimate may be sent to the communications device as location assistance information.

37 Claims, 10 Drawing Sheets

ESTIMATING ALTITUDE OF A COMMUNICATIONS DEVICE

BACKGROUND OF THE INVENTION

1. Field of the Invention

The invention relates in general to estimating three-dimensional location of a communications device.

2. Description of the Related Art

Positioning services have become very popular in the recent years. Positioning refers here to determining the location of a communications device. The communications device may be capable of determining its position based on signals it receives. The signals can be sent either from a specific positioning system or, for example, from a cellular communications system. Alternatively, the communications device may act as a measurement device and send measurement results to a further unit, which then determines the location of the communications device.

Positioning services may be used simply for locating the communications device. The location of the communications device may, for example, be shown on a map at the display of the communications device. Alternatively, it is possible to provide location-dependent services, for example, for users of a communication system. The location of the communications device may affect the content of a location-dependent service. A further option is that the location of the communications device is used for determining whether the service is provided to the communications device at all.

The most widely used positioning system is the Global Positioning System (GPS). GPS positioning is based on measuring relative time of arrival of signals sent simultaneously from a number of GPS satellites. The location of a GPS receiver is determined by determining the distance between GPS satellites and the GPS receiver using time of arrival measurement results together with the exact GPS time. The locations of the GPS satellites can be determined based on navigation information carried in the GPS signals. The navigation information includes both data unique to the transmitting satellite and data common to all satellites. The navigation information contains time information, satellite clock correction data, ephemeris (precise orbital parameters), almanac (coarse orbital parameters), health data for all satellites, coefficients for the ionospheric delay model and coefficients to calculate the Universal Coordinated Time (UTC) from the GPS system time.

In theory, three time of arrival measurements would be enough to calculate the GPS receiver's position and also the velocity, if the exact GPS time is known to the GPS receiver. In practice, a GPS receiver has low-cost, low-accuracy local oscillator as a local clock. Therefore a fourth time of arrival measurement is needed to determine the difference between the local time and the GPS time.

GPS positioning is dependent on obtaining accurate GPS time and navigation information and on performing the distance measurements. For carrying out GPS positioning successfully, signals from three or four GPS satellites need to be received properly for demodulating navigation data needed for the distance measurements. For shortening the time-to-first-fix, it is possible to provide information about the rough location of the GPS receiver to the GPS receiver. Assisted GPS (A-GPS) refers to sending some assistance information to a GPS receiver for helping the receiver to locate itself based on the GPS signals. One example of the assistance information for GPS is information on the rough location of the GPS receiver. By providing a rough estimate of the location of the GPS receiver as location assistance information, the response time of GPS positioning can be shortened.

A communications system, for example a cellular telecommunications system, may be used for transmitting the location assistance information to a communications device incorporating, in addition to the functionality needed for communicating with the communications system, a GPS receiver for receiving GPS signals. The communications system may optionally be equipped with a plurality of reference GPS receivers for obtaining other assistance information than only the rough estimate of the GPS receiver.

In connection with location a mobile station (a communications device) of a cellular telecommunication system, mobile-based positioning refers to determining the location in the mobile station based on the signals received from the cellular telecommunications network or from an external system, such as from the GPS. Mobile-assisted positioning refers to the cellular telecommunication network determining the location of the mobile station, but using information sent by the mobile station. MS-based A-GPS, for example, thus refers here to a location method, where location assistance information is sent to a communications device and the communications device determines its location using the location assistance information and the measurements it has performed on received GPS signals. On the other hand, MS-assisted A-GPS refers here to a location method, where location assistance information is sent to a communications device, which then performs the measurements on the received GPS signals and sends the measurements back to the telecommunication network, which finally uses such measurements for determining the device location. Both in MS-based and in MS-assisted A-GPS, the communication device uses location assistance information to shorten the time needed to perform the measurements on the received GPS signals.

As mentioned above, locating a communications device is possible also using measurements relating to signals of a communications system. Rough location estimates for a communications device can alternatively be obtained based on the identities of the cell(s), via which a communications device is currently communicating.

Until now the development of cellular network based LoCation Services (LCS) algorithms has been mostly focused towards algorithms capable of performing location calculations in a two-dimensional scenario. In other words, these algorithms assume that the Earth's surface locally flat, and they do not take into account the altitude fluctuations.

Algorithm developers have devoted little attention to location calculation algorithms capable of estimating the location of a communications device in a tri-dimensional scenario because of a lack of a clear need for such algorithms. Furthermore, estimating a location of a communications device in tri-dimensions gives rise to technical challenges such as the increased complexity of full tri-dimensional location calculation algorithms and the need of additional measurements for estimating the third coordinate. Recently, however, the results of cellular network based LCS algorithms have been considered to be a valuable component of the location assistance data to be provided to a GPS receiver for MS-based or MS-assisted A-GPS location method.

However, since the results of cellular network based LCS algorithms shall be represented in three-dimensions, a need has arisen for a feasible network based method for estimating the location of a communications device in three-dimensions.

SUMMARY OF THE INVENTION

In accordance with a first aspect of the invention, there is provided a method for estimating altitude of a communications device, comprising the step of estimating the altitude of the communications device based at least on altitude of at least one antenna of the communications system, said communications device communicating with the communications system via said at least one antenna.

In accordance with a second aspect of the invention, there is provided a method for providing location assistance information to a communications device communicating with a communications system via at least one antenna of said communications system, comprising estimating an altitude estimate for the communications device, and determining location assistance information based on a two-dimensional location estimate and the altitude estimate for the communications device.

In accordance with a third aspect of the invention, there is provided a communications system, said communications system comprising storage means for storing antenna information representing at least altitudes of antennas of said communications system, and first estimation means for estimating an altitude of a communications device communicating with the communications system via at least one antenna of said communications system, said altitude estimation being based at least on altitude of said at least one antenna of said communications system.

In accordance with a fourth aspect of the invention, there is provided a network element for a communications system, said network element comprising first determination means for determining antenna information representing at least altitudes of antennas of said communications system, and first estimation means for estimating the altitude of a communications device communicating with the communications system via at least one antenna of the communications system, said altitude estimation being based at least on altitude of said at least one antenna of said communications system.

The altitude estimation may be based at least on altitudes of at least two antennas of the communications system, said communications device communicating with the communications system via said at least two antennas. The altitude estimation may be an average of altitudes of said at least two antennas.

When there is provided a two-dimensional location estimate of the communications device and antenna information representing three-dimensional locations of said at least two antennas, the altitude estimation may be based on said two-dimensional location estimate of the communications device and on said antenna information.

The altitude estimation may use a weighted average of altitudes of said at least two antennas, each weight taking into account said two-dimensional location estimate of the communications device and a two-dimensional location of an antenna of said communications device. Each weight in the weighted average may be inversely proportional to a distance between the two-dimensional location estimate of the communications device and the two-dimensional location of an antenna of said communications system.

Alternatively, the altitude estimation may be determined by projecting the two-dimensional location estimate of the communications device to a reference plane determined using said antenna information.

A method for estimating altitude of the communications device may further comprise the step of estimating said two-dimensional location estimate for the communications device.

Accuracy of the altitude estimate of the communications device may be also estimated.

Altitude of said at least one antenna may represents said at least one antenna at the ground level or above the ground level.

Embodiments of the present invention provide an estimate for the three-dimensional location of a communications device by estimating the altitude of the communications device information about the altitude of at least one antenna of a communications system. A two-dimensional location estimate and information about the two-dimensional locations of antennas of a communications system may optionally be used. An estimate for three-dimensional location of a communications device can be obtained using the same measurements that have been made for estimating the two-dimensional location of the communications device. There is thus no need for modifying cellular network configuration or design for estimating the location of the communications device in three dimensions.

Embodiments of the invention also overcome some technical challenges relating to estimating a location of a communications device in three dimensions. Especially the amount of measurements needed for locating a communications device in three dimensions is not increased from the amount of measurements needed for the two-dimensional location estimate. In fact, once a two-dimensional location estimate is provided there is no need to perform measurements. Furthermore, as height and altitude distribution of antennas of a communication system is typically very small compared to the distribution of the antennas in the horizontal direction, the accuracy of full tri-dimensional location calculation algorithms is quite poor even though the full tri-dimensional location calculation algorithms are quite complex.

BRIEF DESCRIPTION OF THE DRAWINGS

Embodiments of the present invention will now be described by way of example only with reference to the accompanying drawings, in which.

DETAILED DESCRIPTION OF THE EMBODIMENTS OF THE INVENTION

In the description below, reference is made to a GSM network and to a UMTS network. These networks are to be understood as examples of a communications network, where the present invention is applicable.

Figure 1:
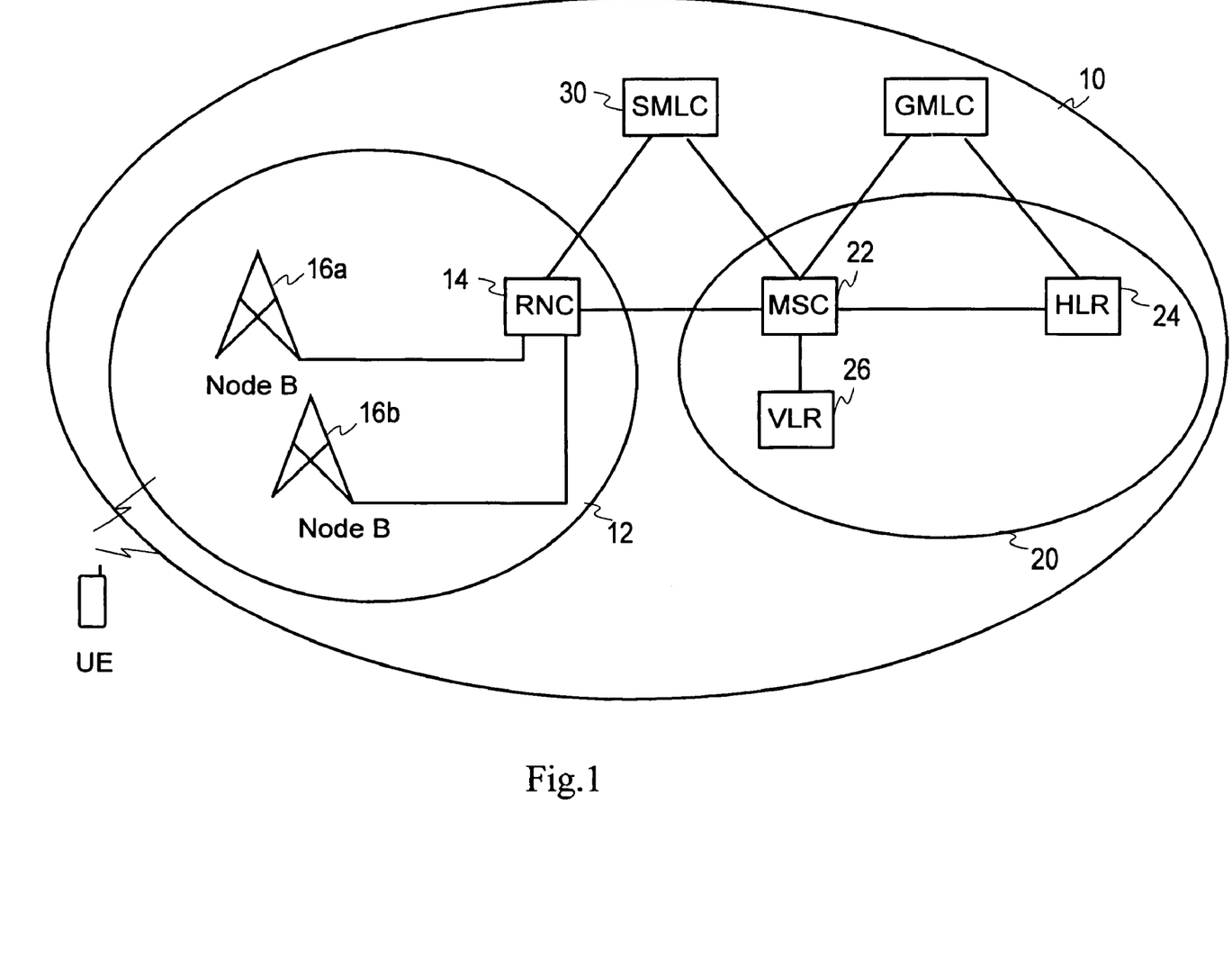
FIG. 1 shows as an example a cellular telecommunications system, where embodiments of the invention are applicable.

FIG. 1 illustrates, as an example, a schematic view of a cellular telecommunications network 10 supporting positioning services. The cellular telecommunications network 10 contains a radio access network 12 and a core network 20. The radio access network 12 has a plurality of radio network controllers (RNC) 14 responsible for controlling the radio resources. A radio network controller 14 may control a plurality of Node B's 16, which are typically connected to a radio network controller with a fixed line connection or, for example, with a point-to-point radio or microwave link. A radio network controller 14 is responsible for controlling and managing the radio resources in a Node B 16. The core network 20 contains Mobile Switching Centers (MSC) 22, a Home Location Register (HLR) 24 and Visitor Location Registers (VLR) 26. FIG. 1 illustrates, as an example, only one RNC, MSC and VLR.

It is appreciated that the names of the network elements of a cellular telecommunications network may vary. The naming of the network elements in connection with FIG. 1 is in accordance with the Universal Moible Telecommunications System (UMTS), but similar network elements are found also in other cellular telecommunication systems. For example, in Global Mobile Telecommunications System (GSM) a transceiver corresponding to Node B is called a base transceiver station (BS), and network element responsible for controlling radio resources is a base station controller (BSC). It is evident to a person skilled in the art that in FIG. 1 a UMTS network is used as an example of a cellular telecommunications system. A cellular telecommunications system, in turn, is here used as an example of a communications system.

Location services architecture is logically implemented in the cellular telecommunications network 10 through the addition of one network node, the Mobile Location Center (MLC) 30. In more general terms, a location server is typically provided in a cellular telecommunications network for supporting location services. A MLC can be either a Serving MLC (SMLC) or a Gateway MLC (GMLC). The SMLC manages the overall coordination and scheduling of resources required to perform positioning of a mobile station. The SMLC typically calculates the final estimate and accuracy for the location of a mobile station. The GMLC is a node, which an external LCS client accesses for obtaining location information about a mobile station. The GMLC obtains location area of the mobile station from Home Location Register after proper authentication, and can then obtain information about the location of the mobile station from the serving MLC.

For positioning a communications device using a satellite positioning system and with the location assistance information provided from a communications system, the communications devices needs to be provided with functionality to receive and process signals from satellite positioning system satellites and with functionality to receive and process signals from the communication system.

Figure 2:
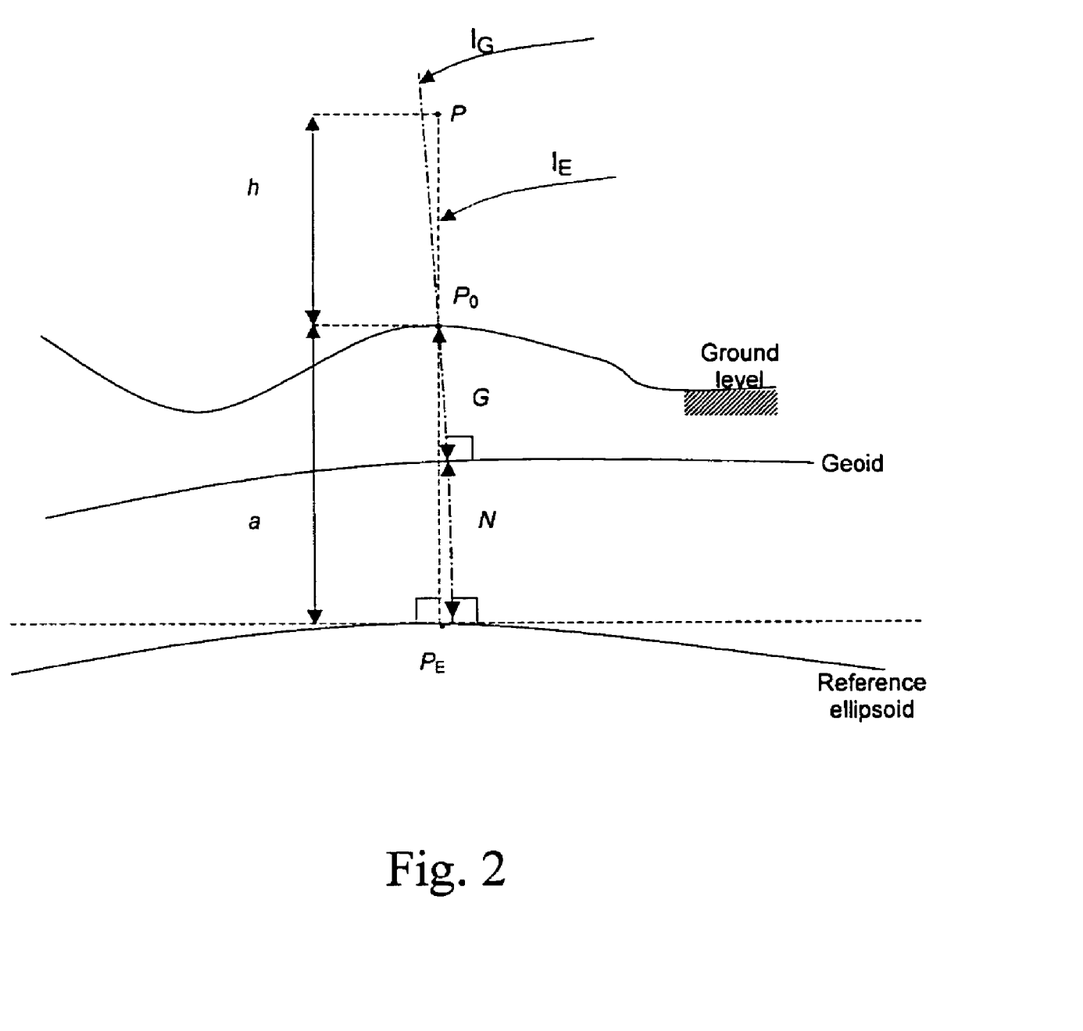
FIG. 2 shows definitions for certain terms relating to the altitude and height of a point P.

For facilitating detailed discussion on estimating the location of the communications device in three dimensions, reference is made to FIG. 2, which shows three surfaces usually taken into consideration in geodetic applications. These surfaces are the Earth's topographic surface, the geoid, and reference ellipsoid.

The geoid is the particular equipotential surface of the Earth's gravity field that is closely associated to the mean ocean surface. The geoid has been traditionally used as a reference surface for the mean sea level and it is expressed at a given point in terms of the geoid undulation N, which is the distance above (+N) or below (−N) the reference ellipsoid (see FIG. 2). To write the analytical expression of the geoid requires that the Earth's density is known at each point. The reference ellipsoid is an equipotential ellipsoid of revolution, which approximates with a certain degree of accuracy the geoid and, at the same time, can be handled mathematically more easily than the geoid.

The height of a point on the Earth's surface (see, for example, $P_0$ in FIG. 2) can be expressed with respect to the reference ellipsoid, in which case it is called altitude (or geodetic height) a, or with respect to the geoid, in which cases it is referred to as orthometric height, G. The altitude can be derived from satellite-based positioning systems such as the GPS (Global Positioning System) and can be related to the orthometric height through the geoid undulation N by means of the following widely accepted approximation: $a \cong G + N$.

The expression above indicates that the geodetic height of a point on the Earth's surface is a good approximation of the height measured along the line of gravity through the point itself. The line of gravity trough point $P_0$ is shown in FIG. 2 with line $l_G$. A similar approximation holds also for points that are located in proximity of the Earths' surface.

Given a certain point P above or below the Earth's surface (see FIG. 2), its coordinates with respect to the reference ellipsoid are the following. Firstly, latitude and longitude are the two angles defining the position of the projection of the point over the reference ellipsoid ($P_E$). The line of projection orthogonal to the reference ellipsoid is shown in FIG. 2 with line $l_E$. Secondly, geodetic height or altitude a represents the height of P relative to the ellipsoid, measured on the straight line of projection $l_E$, orthogonal to the ellipsoid through P.

Figure 3:
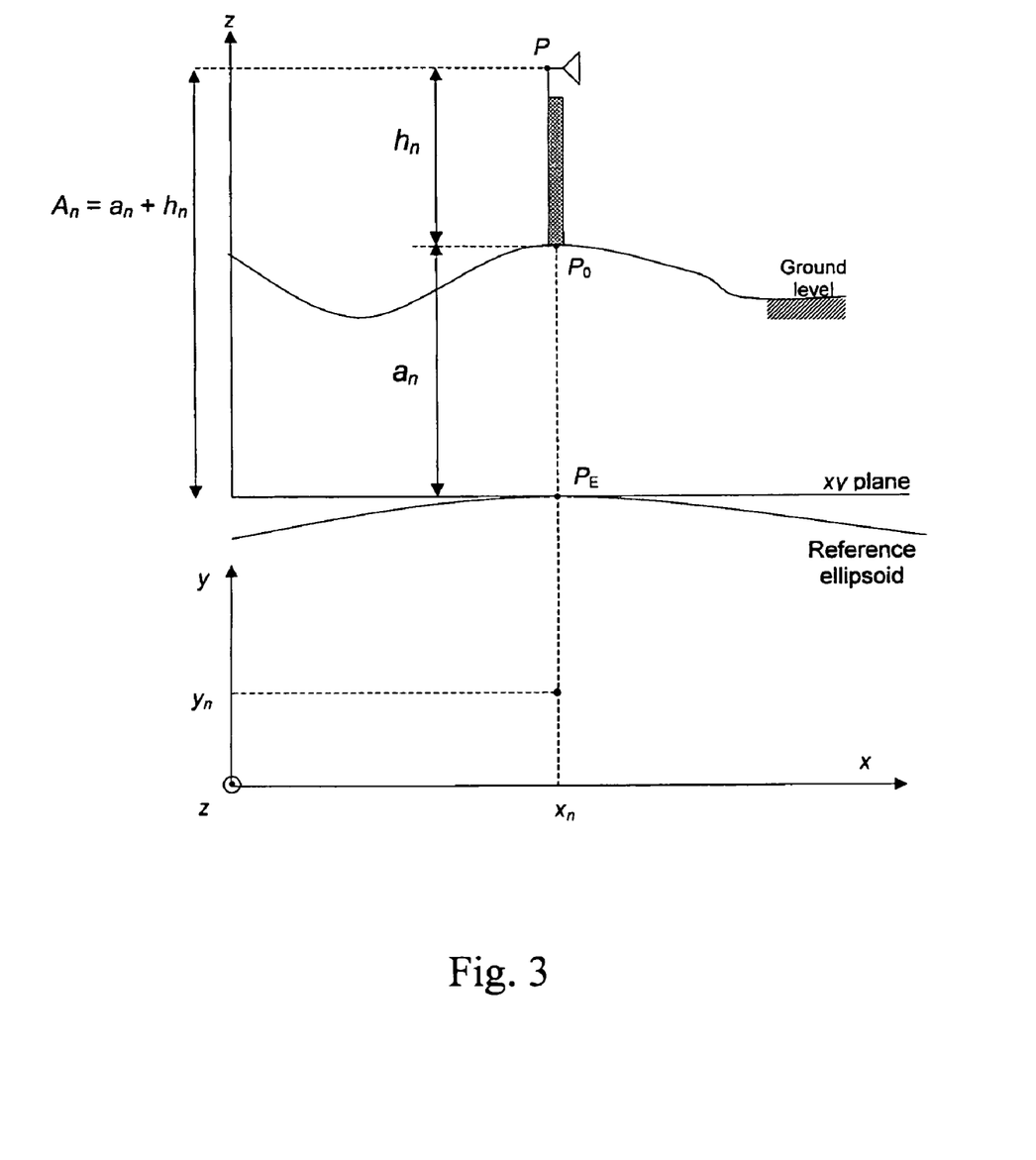
FIG. 3 shows definitions for antenna coordinates, altitude and height.

FIG. 3 shows, as an example, an antenna of a Node B at point P. The location of the antenna can be represented using the following parameters. The latitude and the longitude of the antenna at point P are usually assumed to be the latitude and the longitude of the Node B at point $P_0$. For location calculation purposes latitude and longitude coordinates are generally mapped onto a local two-dimensional xy Cartesian reference system tangent to the reference ellipsoid in a reference point $P_E$.

The upper part of FIG. 3 shows the reference ellipsoid and the reference point $P_E$, which is a projection of point $P_0$ on the reference ellipsoid. The upper part of FIG. 3 further shows the local two-dimensional xy Cartesian reference system tangent to the reference ellipsoid in $P_E$. The lower part of FIG. 3 shows the xy plane, in other words the view in the direction of the projection line $l_E$. The coordinates of the Node B in the local two-dimensional xy reference system are later referred to as $x_n$ and $y_n$ coordinates (see lower part of FIG. 3, which represents the xy plane). Here n is a subscript identifying the Node B or a corresponding network element.

The upper part of FIG. 3 shows Node B altitude $a_n$, which is the altitude of the ground level at point $P_0$ from the reference geodetic ellipsoid. The antenna height $h_n$ is the height of the Node B antenna measured above the ground level. The antenna height $h_n$ can be measured either along the gravity line (for example, by means of a plumb) or along the orthogonal to the reference ellipsoid (for example, with a GPS receiver). The height of the Node B antenna above the reference ellipsoid $A_n$ can be approximated by the sum of antenna height and Node B altitude: $A_n \cong h_n + a_n$.

For estimating the altitude of a communications device UE, it is here assumed that a two-dimensional location estimate for the communications device is available and that the communications device is on the ground level. Given these assumptions, the problem discussed here consists in estimating the UE altitude rather than its height above the reference ellipsoid. It is appreciated that especially for the purpose of providing location assistance information for Assisted GPS, the altitude estimate for the communications device may be quite rough, so the assumption about the communications device being on the ground level is acceptable. In addition to the two-dimensional location estimate, a corresponding confidence region may have been calculated beforehand and may be available.

The available two-dimensional UE location information is typically represented in an xy Cartesian reference system, which is a local plane approximation of the reference ellipsoid (see FIG. 3). The tri-dimensional UE location information is typically represented in an xyz Cartesian reference system, where the z coordinate represents the altitude over the reference ellipsoid (that is, over the xy plane).

The tri-dimensional location estimate is obtained by modeling the ground level with a certain reference plane (RP). Some possible definitions for the reference plane are discussed, by the way of example, in more detail below. Since the reference plane is an approximation of the Earth's surface and since the UE is assumed to be located on the Earth's surface, the UE altitude is calculated by assuming that the available two-dimensional location estimate is a projection over the xy plane of the tri-dimensional location lying on the reference plane (see FIG. 4). The same general principle may be used to transform a two-dimensional confidence region, if available, into a tri-dimensional confidence region.

Figure 4:
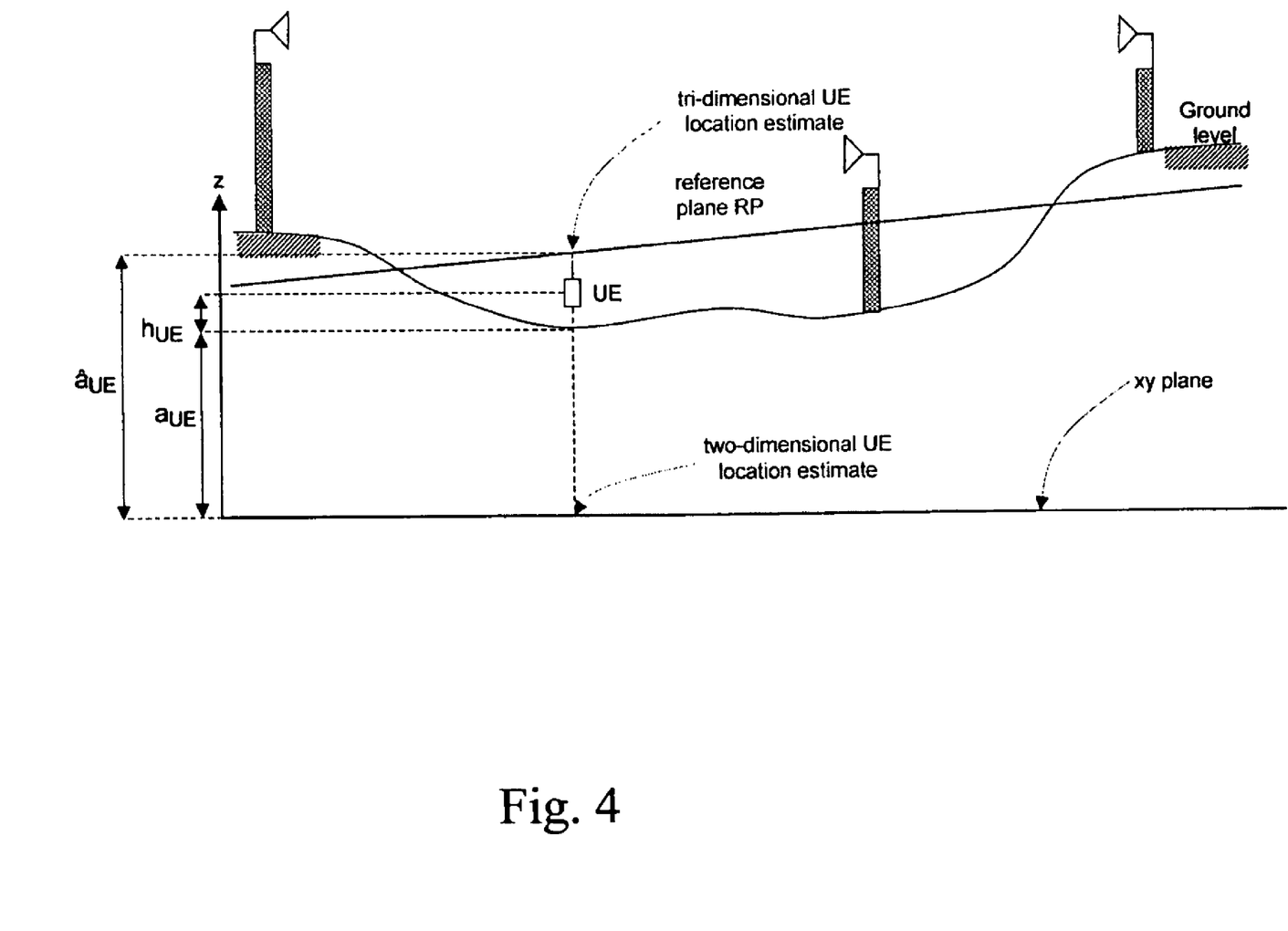
FIG. 4 shows a two-dimensional view of the geometry relating to locating a communications device and a reference plane.

FIG. 4 shows an example, where the two-dimensional location estimate for the communications device UE is accurate. In other words, the two-dimensional location estimate corresponds to the location of the communications device when projected to the xy plane. The two-dimensional location estimate may be taken as the x and y coordinates of the tri-dimensional location estimate, and the reference plane distance from the xy plane at the point defined by the two-dimensional location estimate may be taken as the altitude estimate $\hat{a}_{UE}$ for the communications device. As shown in FIG. 4, the sum of the true altitude $a_{UE}$ of the communications device and of the height $h_{UE}$ of the communications device may well be different from the altitude estimate $\hat{a}_{UE}$.

Once the reference plane is defined, the computation of the altitude estimate $\hat{a}_{UE}$ is straightforward given the two-dimensional (x, y) coordinates. The definition of the reference plane may be done, for example, in accordance with one of the following alternatives. Here the number of cells involved in the altitude estimation calculations is denoted with $N_c$ and the number of antenna sites involved in the altitude estimation calculations is denoted with $N_s$. For any value of $N_c \geq 1$, $N_s$ can have any value between 1 (when all cells have co-located antennas) and $N_c$ (when all cells have spatially separated antennas).

In a first alternative, the reference plane is assumed to be a plane parallel to the yx plane. The z coordinate of the reference plane is equal to a weighted average of the antennas' altitudes:

RP: $z = a_{AVG}$ where $a_{AVG} = (a_1/d_1 + \ldots + a_N/d_{Nc})/(1/d_1 + \ldots + 1/d_{Nc})$ and $d_n$ is the distance in the xy plane between the n-th cell's antenna ($n=1, \ldots, N_c$) and the two-dimensional location estimate of the communications device. It is appreciated that other weights may alternatively be applied or that the weights may be equal. This reference plane parallel to the xy plane may be used irrespectively of the alignment of the antenna sites involved in the location estimate calculations. The altitude of the communications device may be determined directly as the weighted average of the antennas' altitudes; in this case the reference plane is implicitly defined.

A second alternative for the reference plane definition is suitable for a situation, where the antenna sites involved in the altitude estimation calculations are aligned. In other words, the antenna sites lie on a straight line. In this case is it possible to define the reference plane to be a plane, where this straight line connecting the antenna sites lies. As the line connecting the sites does not define a plane unambiguously, a further restriction needs to be posed. Two examples of such a restriction are that the xy plane is tilted along a line parallel either to x axis or y axis for making the line connecting the antenna sites to lie in the reference plane.

A third alternative for the reference plane is applicable, when three non-aligned antenna sites are involved in estimating the altitude of the communications device. In this case, the reference plane may be defined by the analytical expression given by the following determinant:

$$RP: \begin{vmatrix} x - x_1 & y - y_1 & z - a_1 \\ x_2 - x_1 & y_2 - y_1 & a_2 - a_1 \\ x_3 - x_1 & y_3 - y_1 & a_3 - a_1 \end{vmatrix} = 0$$

where $(x_n, y_n, a_n)$ are the x,y coordinates and altitude of the n-th Node B antenna site ($n=1, \ldots, N_s$).

A fourth alternative for the reference plane is applicable, when four or more non-aligned antenna sites are involved in estimating the altitude of the communications device. In this case, the reference plane may be defined as the regression plane RP: $z = A + Bx + Cy$ with coefficients (A, B, C) minimizing the sum of squared differences $(A + Bx_n + Cy_n - a_n)^2$; $n=1, \ldots, N_s$. It can be proved that the regression plane's coefficients are defined by the solution of the following simultaneous equations (the summations span the indices $n=1, \ldots, N_s$):

$\Sigma a_n = NA + B\Sigma x_n + C\Sigma y_n$ $\Sigma x_n a_n = A\Sigma x_n + B\Sigma x_n^2 + C\Sigma x_n y_n$ $\Sigma y_n a_n = A\Sigma y_n + B\Sigma x_n y_n + C\Sigma y_n^2$ In addition to a two-dimensional location estimate for the communications device, an estimate for the uncertainty or accuracy of the two-dimensional location estimate may be available. The combination of the two-dimensional location estimate and of the confidence region is often referred to as a shape. Table 1 below lists some examples of shapes in the left-hand column. Typically a location estimation algorithm used in cellular telecommunication network can produce at least one of these shapes. Some of the shapes are discussed in more detail in 3GPP Technical specification TS 23.032 "Universal Geographical Area Description (GAD) (Release 4)", V4.1.1, in Section 5. It is noted that any one of the shape types listed in the left-hand column of Table 1 may be supported by any method of estimating location of a communications system in two dimensions.

It is noted that the geographical coordinates of the shapes may be expressed, for example, in a same local Cartesian reference system used to represent the coordinates of network elements, or, as a second example, in a geodetic format including latitude and longitude. If the estimation of the altitude of a communications device is performed in a local Cartesian reference system, the shape is preferably expressed in the same local Cartesian reference system or alternatively converted to this format. It is also noted that the orientation angles included in the shapes may be measured, for example, in radians counterclockwise from the x-axis of the Cartesian reference system, or as a second example, in degrees clockwise from North. The shape types in Table 1 are, by the way of example, expressed in a Cartesian coordinate system.

The first shape type in Table 1 is a Cartesian Point, which corresponds to the "Ellipsoid Point" Shape defined in TS 23.032. The Cartesian Point type defines a point $(x_{est}, y_{est})$ in the local Cartesion system and does not include a confidence coefficient value.

The second shape type in Table 1 is a Cartesian point with uncertainty Ellipse, which corresponds to the "Ellipsoid Point with uncertainty Ellipse" shape defined in TS 23.032. This "Cartesian point with uncertainty Ellipse" shape type has the following parameters: the Cartesian coordinates of an origin (generally the location estimate); a semi-major axis $R_1$; a semi-minor axis $R_2$; an orientation angle α measured, for example, counterclockwise from the x axis; and a confidence coefficient value.

The third shape type in Table 1 is a Cartesian polygon and the fourth shape type in Table 1 is a Cartesian point with uncertainty Polygon. The difference here is that the fourth shape has coordinates $(x_{est}, y_{est})$ representing of the two-dimensional location estimate. The following properties allow determining the polygonal confidence region from the list of vertices $(x_1,y_1), \ldots, (x_N,y_N)$. The polygon vertices are connected in the order they are given, and the last vertex is connected to the first vertex. A line connecting two vertices is the line of minimum distance between the two vertices, and the vertices are defined in such a way that a connecting line does not cross any other connecting line. The polygon area is situated on the right of the connecting lines, with the forward direction being from a vertex to the next.

The fifth shape type in Table 1 is a Cartesian Arc, and it correspond to the "Ellipsoid Arc" defined in TS 23.032. The Cartesian arc is defined by the following coordinates: the Cartesian coordinates of an origin $(x_{origin}, y_{origin})$, an inner radius $R_1$, an uncertainty radius $R_2$, an offset (orientation) angle α measured counterclockwise from the x axis and an included angle, β.

The sixth type is a Cartesian point with the uncertainty Arc. This shape type includes Cartesian coordinates of a location estimate, $x_{est}$ and $y_{est}$. The uncertainty arc is defined similarly as the Cartesian Arc in the fifth shape type. A confidence coefficient value is also specified.

Figure 5:
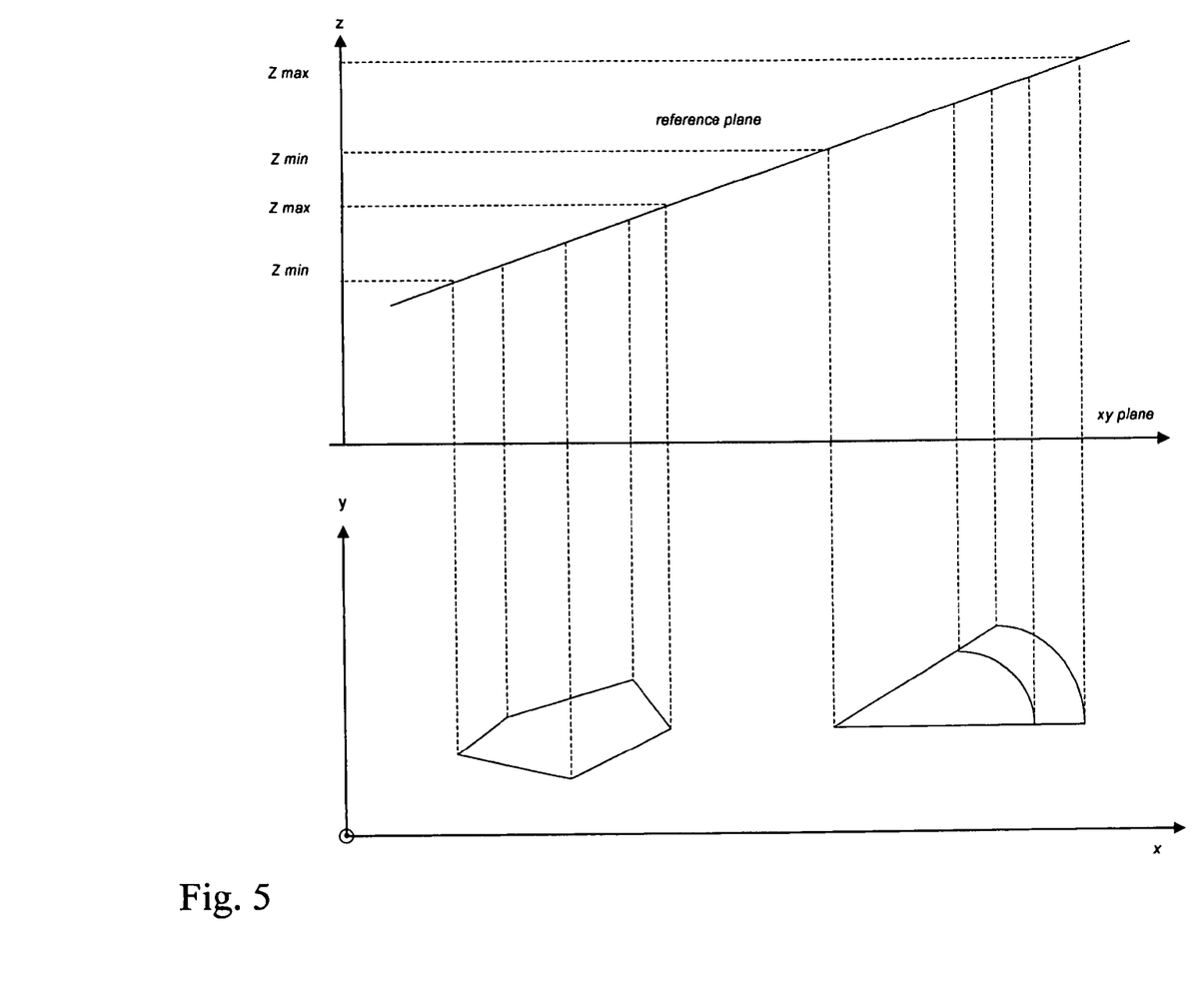
FIG. 5 shows calculations relating to estimating the accuracy of an altitude estimation.

In the following it is discussed how to determine an estimate of vertical uncertainty of the altitude estimate for the communications device. One option is to project the uncertainty area (confidence region) to the reference plane. FIG. 5 shows, as examples, $z_{min}$ and $z_{max}$ values associated to an uncertainty polygon and to an uncertainty arc. The center column of Table 1 lists some example parameters for specifying an estimate for the vertical uncertainty of the altitude estimate for the communications device. A further alternative to estimate the accuracy of the altitude estimation is to incorporate the uncertainty related to the reference plane, for example, by taking into account the inaccuracy of the parameters obtained from the regression plane calculations.

TABLE 1

Adaptation of two-dimensional shapes to three-dimensional scenario

| Two-dimensional Shape | Three-dimensional Shape | New parameters |
|---|---|---|
| Cartesian Point | Cartesian Point with altitude | UE altitude |
| Cartesian point with uncertainty Ellipse | Cartesian point with altitude and uncertainty Ellipsoid | UE altitude Vertical uncertainty |
| Cartesian Polygon | Cartesian Polygon with altitude | Polygon vertices altitude |
| Cartesian point with uncertainty Polygon | Cartesian point with altitude and uncertainty Polygon | UE altitude Polygon vertices altitude |
| Cartesian Arc | Cartesian Arc with altitude | Arc origin altitude; Arc vertices altitudes; reference plane parameters |
| Cartesian point with uncertainty Arc | Cartesian point with altitude and uncertainty Arc | UE altitude Arc origin altitude; Arc vertices altitudes; reference plane parameters |

Figure 6:
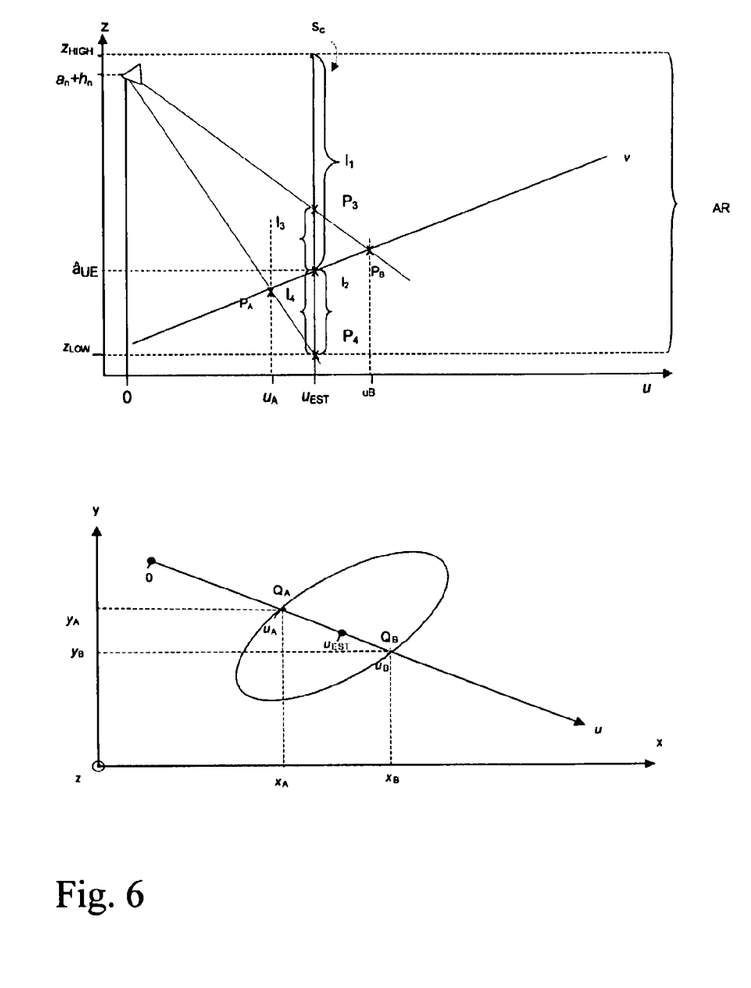
FIG. 6 shows details relating to estimating the accuracy of an altitude estimation using an uncertainty ellipse.

Further options for estimating uncertainty of the altitude estimate for the communications device are discussed next in connection with an uncertainty ellipsoid shown in the lower part of FIGS. 6 and 7. The two-dimensional ellipse is here regarded as a projection of a three-dimensional ellipsoid onto the xy plane, and the aim is to estimate the shape of the three-dimensional ellipsoid based on its known projection.

Define first a horizontal acceptance region enclosed within the two planes $z=z_{HIGH}$ and $z=z_{LOW}$ defined as follows:

$$z_{HIGH} = \max\{a_1+h_1, \ldots, a_{Nc}+h_{Nc}\}$$

$$z_{LOW} = \min\{a_1, \ldots, a_{Nc}\}$$

where $N_c$ is the number of cells involved in the altitude estimate calculation and $a_n$ and $h_n$ are the altitude and antenna height of the n-th cell ($n=1, \ldots, N_c$), respectively. The upper parts of FIGS. 6 and 7 show the acceptance region AR. The purpose of the acceptance region is to limit the high of the three-dimensional ellipsoid to certain bounds.

For each of the $N_c$ cells repeat the following steps. First, define on the xy plane the axis u going from the current cell's xy coordinates (taken as origin of the u axis) to the two-dimensional location estimate (see lower part of FIG. 6). If the location estimate is at the Node B coordinates, the u axis is the ellipse's major axis. Second, define the intersections $Q_A=(x_A, y_A)$ and $Q_B=(x_B, y_B)$ between two-dimensional ellipse and a straight line along the direction u on the xy plane, being $Q_A$ the closest intersection to the cell's site.

Third, project the two-dimensional location estimate and the intersections $Q_A$ and $Q_B$ on the u axis, and label the coordinates of the projections on the u axis $u_{EST}$, $u_A$ and $u_B$, respectively. Fourth, project $Q_A$ and $Q_B$ on the reference plane RP to calculate their heights $z_A$ and $z_B$, respectively. Then define on the uz plane (parallel to the u axis and orthogonal to the xy plane) the straight-line v, going from $P_A=(u_A, z_A)$ to $P_B=(u_B, z_B)$. This line represents the intersection between reference plane and the uz plane. The upper parts of FIGS. 6 and 7 illustrate the uz plane and line v on it. Define also line $s_c$, which is in the uz plane, normal to the xy plane and intersects $u_{est}$.

A first alternative for estimating the vertical uncertainty is simply to use the acceptance region AR. This is illustrated in the upper part of FIG. 6 with the lines $l_1$ and $l_2$ which illustrate the distance between the altitude estimate of the communications device $\hat{a}_{est}$ and the limits of the acceptance region AR. The vertical uncertainty can be consider to be max$\{l_1, l_2\}$. It is to be noted, however, that this alternative does not use any information about the two-dimensional uncertainty ellipse.

A second alternative for estimating the vertical uncertainty is simply to draw lines in the uz plane (see the upper part of FIG. 6) from the antenna point to the points $P_A$ and $P_B$. These lines intersect line $s_c$ at $P_3$ and $P_4$. The distance between $P_3$ and the altitude estimate of the communications device $\hat{a}_{est}$ is $l_3$ and the distance between $P_4$ and the altitude estimate of the communications device $\hat{a}_{est}$ is $l_4$. The vertical uncertainty may be considered to be maximum of these distances, considering that points $P_3$ and $P_4$ are within the acceptance region. In the example of FIG. 6, the vertical uncertainty would thus be $l_3$. This second alternative is insensitive to the orientation of the two-dimensional uncertainty ellipsoid with respect to the xy plane axis.

Figure 7:
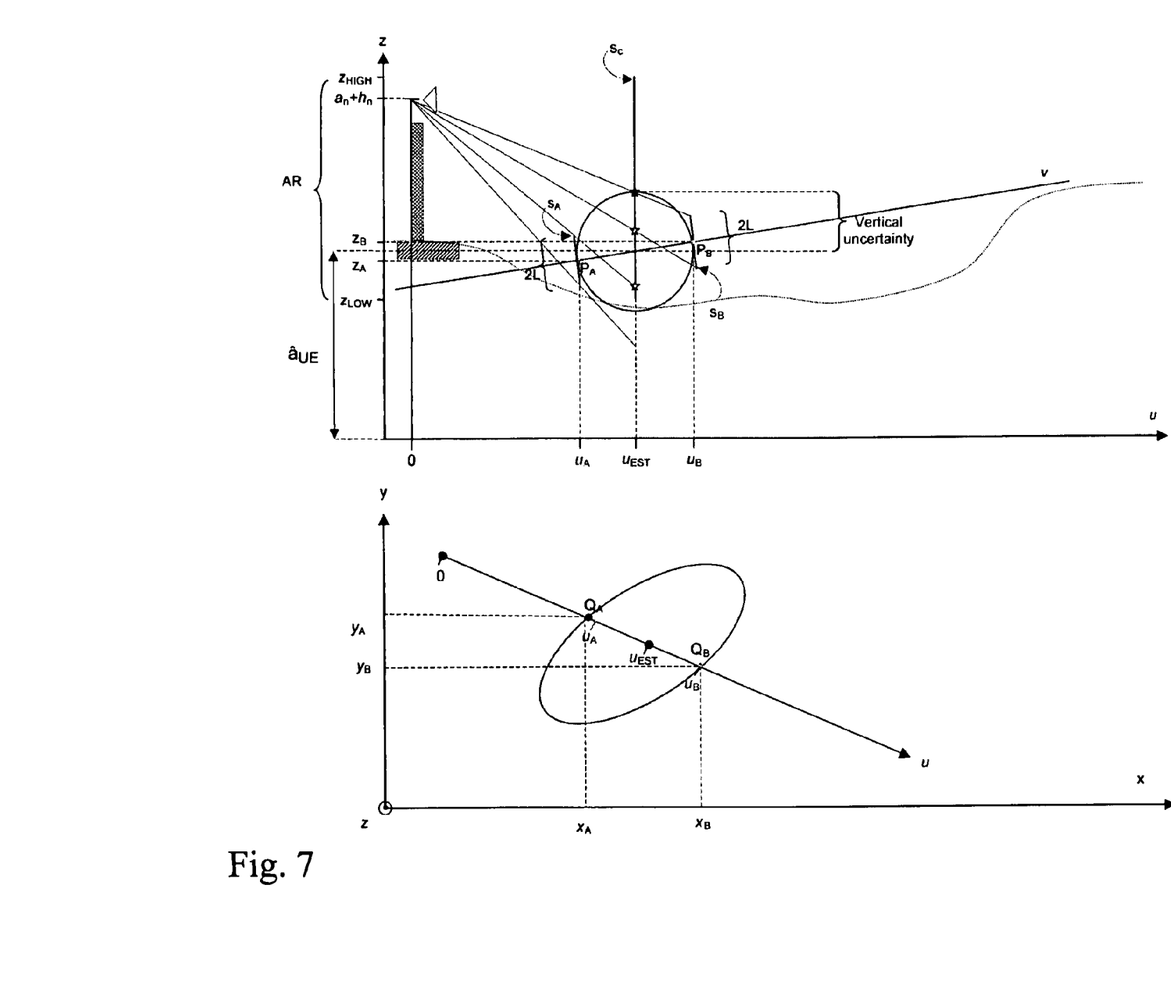
FIG. 7 shows further details relating to estimating the accuracy of an altitude estimation using an uncertainty ellipse.
Figure 8:
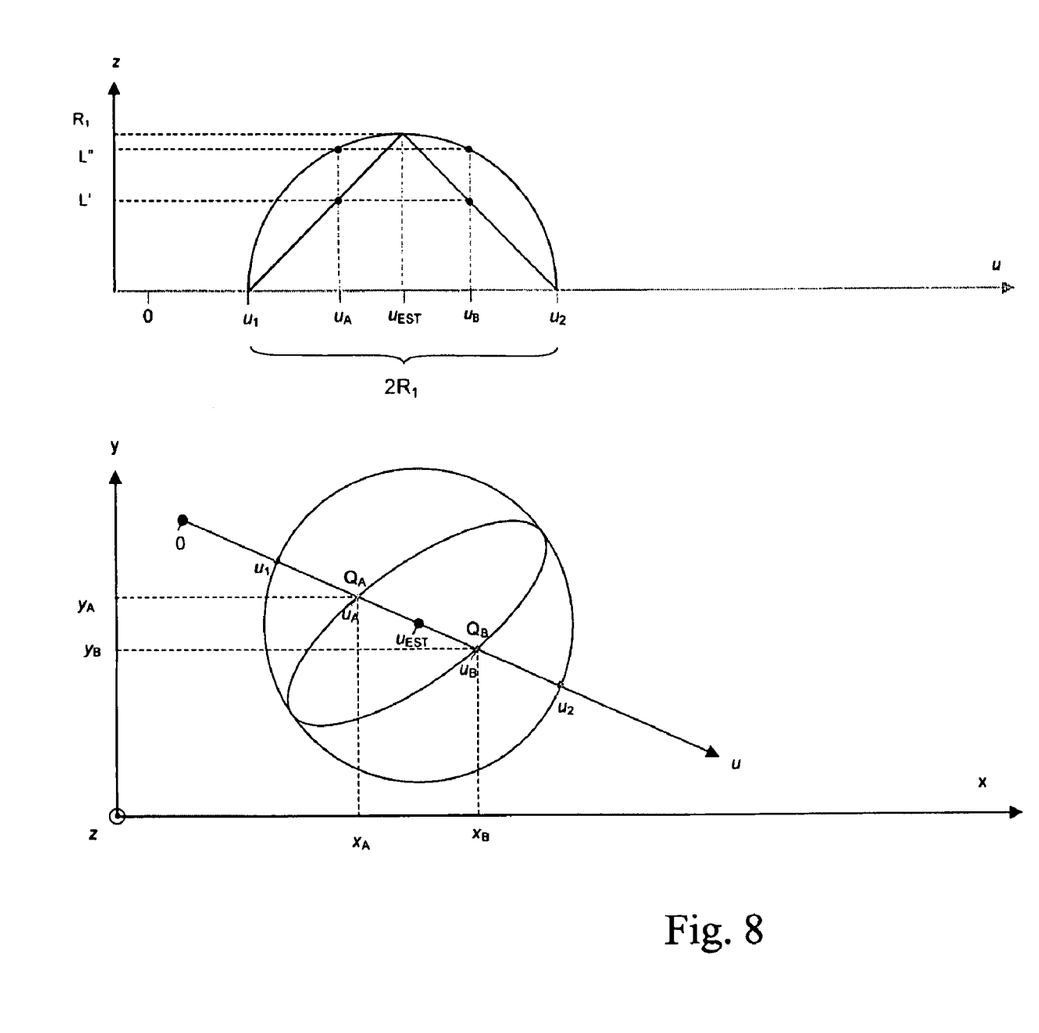
FIG. 8 shows further details relating to estimating the accuracy of an altitude estimation using an uncertainty ellipse.

A third alternative for estimating the vertical uncertainty is illustrated in FIGS. 7 and 8. Define two segments, $s_A$ and $s_B$, orthogonal to v through $P_A$ and $P_B$ with total length $2L \geq 0$. The extremes of these segments define a rectangle around the location estimate with sides parallel to v, which is supposed to include the true UE location. Define a third segment, $s_C$, orthogonal to the xy plane through the location estimate, with length limited by the acceptance region. The segment $s_C$ represents the local vertical to the ellipsoid, along which the vertical uncertainty of the uncertainty ellipsoid is measured. Define a vertical segment in the uz plane with extremes (0,0) and (0, $a_n+h_n$) representing the current (n-th) Node B antenna. Define four straight lines connecting the Node B antenna with the extremes of the segments $s_A$ and $s_B$. For each straight line, calculate the intersections with $s_C$ and retain the ones falling within the acceptance region (represented by stars in the upper part of FIG. 7). Select the intersection with the largest distance from the altitude estimate of the communications device (see the upper part of FIG. 7).

When all steps above are completed for all cells, select the intersection with largest distance from the location estimate among the intersections selecting for each cell. The distance of the intersection selected from the reference plane defines the vertical uncertainty of the uncertainty ellipsoid. The resulting ellipsoid will include, if not all, large part of the rectangle defined by the extremes of the segments $s_A$ and $s_B$, defined for each Node B.

In the example in FIG. 7, where only one antenna is considered to be involved in estimating the altitude of the communications device, a cross section of the estimated uncertainty ellipsoid is shown. The ellipse in the upper part of FIG. 7 is the uz cut of the three-dimensional uncertainty ellipsoid.

The algorithm described above does not provide any indication on the value of parameter L, used to define the length of segments $s_A$ and $s_B$. A separate value for L must be calculated for each of the Nc cells involved in the calculation. The value of L can be calculated with the aid of a sphere centered at the location estimate with radius equal to the two-dimensional confidence ellipse semi-major axis, $R_1$. This sphere thus encompasses the confidence ellipse. In the xy plane this sphere is a circle tangent to the two-dimensional confidence ellipse. In the uz plane, it is used as rough estimate of the uz plane cut of the tri-dimensional confidence ellipsoid.

Once the sphere is defined, the value of L can be calculated as the height of the projection on the sphere of the point ($u=u_A$, $z=0$) in the uz plane. Alternatively, L can be set equal to the height of the projection of the same point on the straight line connecting the points ($u_1$, 0) and ($u_{EST}$, $R_1$) in the uz plane. The method can be understood with the aid of FIG. 8, where the first value of L is represented by L" and the second value is represented by L'. It can be observed that a large value of L corresponds to a small value of ($u_B-u_A$) and vice-versa. This is the result of the dependence of L on the orientation of the two-dimensional ellipse with respect to the cell under consideration. The value of L thus aims to take into account the orientation of the two-dimensional ellipse with respect to the u axis.

It is appreciated that the vertical certainty relating to a two-dimensional uncertainty ellipse need not be estimate exactly in one of the ways discussed above, but other variations are also possible.

The right-hand column of Table 1 indicates parameters added to the two-dimensional location estimate information for obtaining three-dimensional location estimates.

Figure 9:
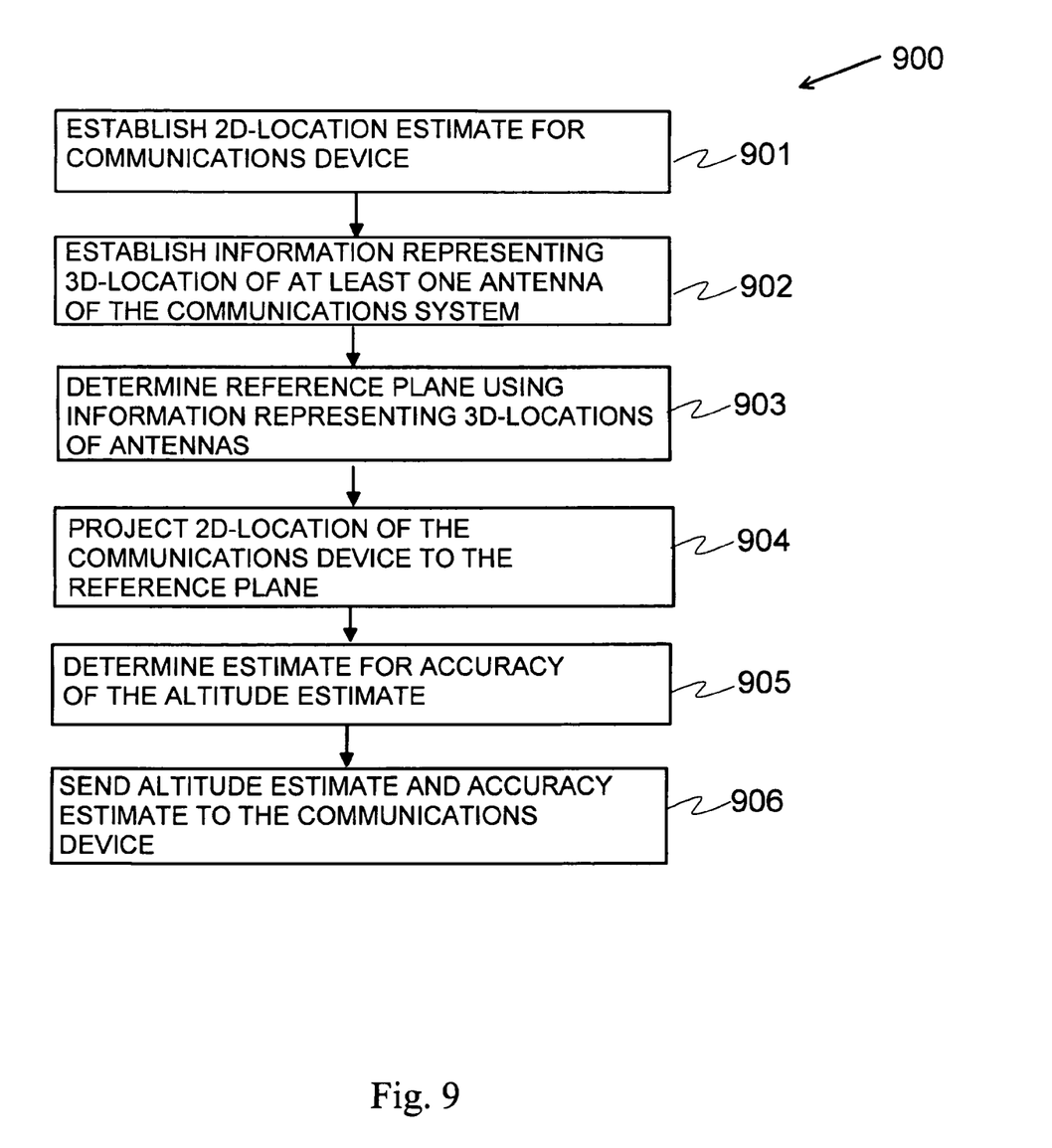
FIG. 9 shows a flowchart of a method in accordance of an embodiment of the invention.

FIG. 9 shows a flowchart for a method 900 of estimating altitude of a communications device. In step 901, a two-dimensional location estimate is established. For example, this two-dimensional location estimate may be provided by a separate entity or it may be calculated by the same entity that is estimating the altitude of the communications device. In step 902, information is established about those antennas of the communications system that are to be involved in determining the altitude estimate. At least one antenna of the communications system needs to be involved. The information about the antennas contains information representing the three-dimensional locations of the antennas. As the communications device is considered to be on the ground, the information representing the antennas generally refers to location of the antenna site on the ground level. In other words, there is generally provided information about the two-dimensional location of the antenna sites and about the antenna site altitudes. This information may be already expressed in a local Cartesian coordinate system, or it may be converted to a local Cartesian coordinate system for carrying out the altitude estimation for the communications device. It should be noted that the Cartesian coordinate system is not the only option for estimating the altitude of a communications device, but it is very suitable for this use. In some embodiments of the invention, the antenna or antennas used for estimating the altitude of the communications device are the same as used for estimating the two-dimensional location of the communications device, but this need not necessarily be the case.

In step 903 a reference plane RP is determined using the information about the two-dimensional location of the antenna(s) and about the antenna site altitude(s). In step 904 the two-dimensional location of the communications device is projected to the reference plane for determining the altitude estimation for the communications device. In step 905, the accuracy of the altitude estimation is determined. This step is optional. As an example of the use of the altitude estimate for the communications device, in step 906, the altitude estimation and the two-dimensional location estimate are sent to the communications device as location assistance information. Also the accuracy of the altitude estimation may be sent to the communications device.

The functionality relating to estimating the altitude of a communications device is typically provided in a location server, for example in a Mobile Location Center. The functionality of a location server may be incorporated to a further network element, for example to a network element responsible for radio resource control in a cellular telecommunications network.

Figure 10:
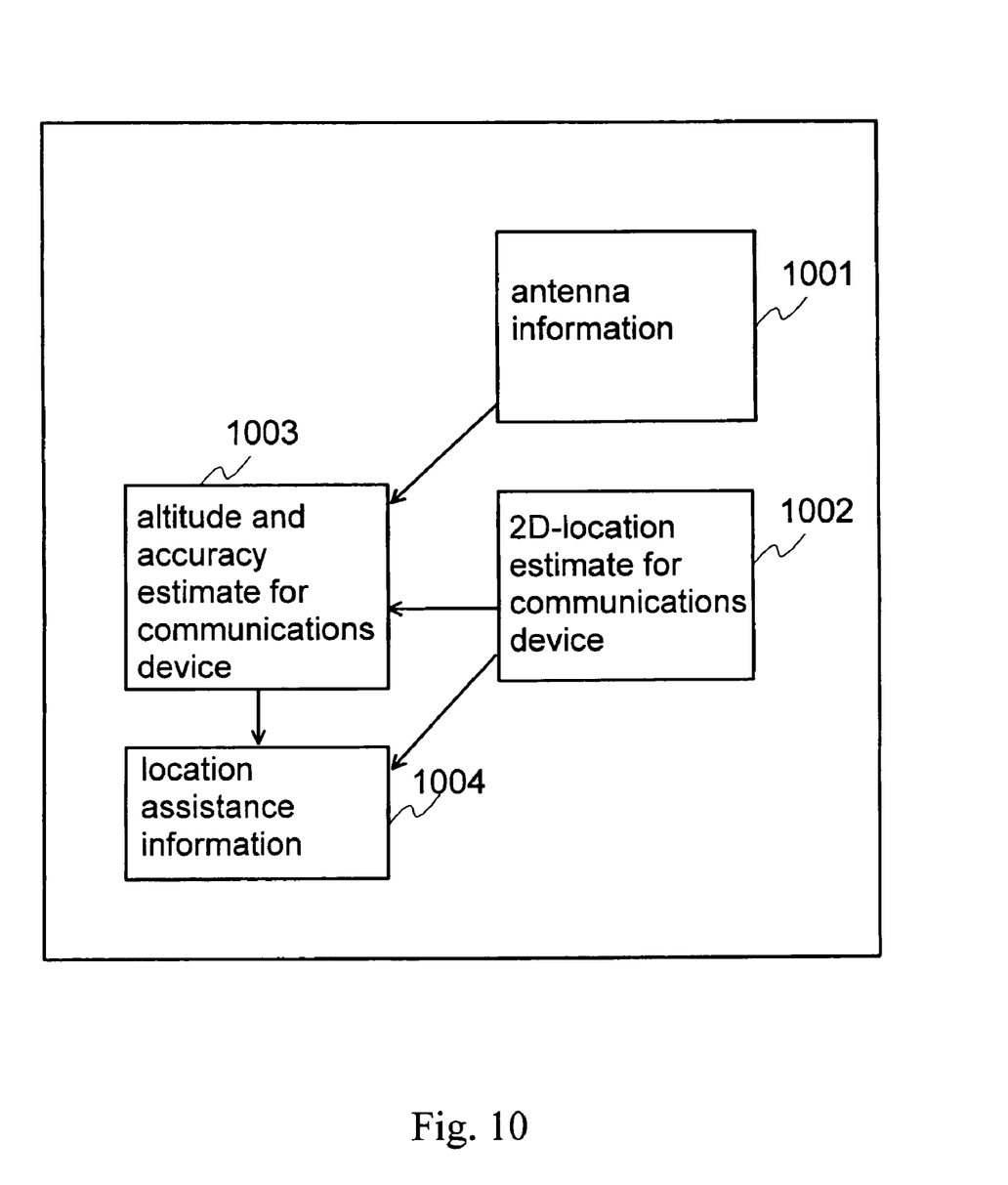
FIG. 10 shows a block chart of a network element for estimating altitude of a communications device.

FIG. 10 shows a block chart of a network element 1000 for estimating altitude of a communications device. Block 1001 refers to antenna information, that is to information about antennas of the communications system. Antenna information may represent only altitudes of the antennas, but usually it represents three-dimensional locations of the antennas. Block 1001 is responsible for determining antenna information. Block 1001 may be implemented in a memory element, and the information representing three-dimensional antenna locations may be stored locally in the network element 1000. Alternatively, block 1001 may be implemented as an interface for receiving or fetching the relevant information from a further information storage. Block 1002 refers to two-dimensional location estimate of the communications device, and block 1002 is responsible for determining the two-dimensional location estimate for the communications device. Block 1002 may be responsible for estimating the two-dimensional location estimate, for example, based on signal measurements or on cell identities. Block 1002 is typically implemented as a suitable software program to be run on a processor. Alternatively, block 1002 may be implemented as an interface for receiving the two-dimensional location estimate from a separate network element.

Block 1003 in the network element 1000 refers to altitude estimate for the communications device, and block 1003 is responsible for estimating the altitude. Block 1003 may further be responsible for estimating the accuracy of the altitude estimate. Block 1003 is typically implemented as a suitable software program to be run on a processor. Alternatively, block 1003 may be implemented as hardware designed especially for estimating altitude of a communications device.

Block 1004 in the network element 1000 refers to location assistance information, and it is responsible for processing the altitude estimate and the two-dimensional location estimate into a format suitable for sending to the communications device as location assistance information. Block 1004 may further send the location assistance information to the communications device using, typically, existing information transmission facilities of the communications device.

As mentioned above, the two-dimensional location estimate may be determined as part of the same process as the altitude estimation. The two-dimensional location estimate for the communications device may be determined based on signal timing measurements, signal strength measurements, and/or direction of arrival measurements relating to at least one antenna of the communications system. Alternatively, the two-dimensional location estimate may be based on the cell identity of at least one antenna via which the communications device is communicating.

It is appreciated that although in the above description reference is made mainly to the GSM and UMTS cellular telecommunications systems, the present invention is applicable also in other communications systems.

The term communications device in this description and in the appended claims refers to any device capable of communicating via a communications system. Examples of such communications devices are, for example, a mobile phone, a PDA (personal digital assistant) device, a portable computer, a mobile terminal or any other type of user equipment.

It is appreciated that estimation of the altitude of a communications device may be performed in another coordinate system than in the local Cartesian coordinate system. It is noted, however, that the reference plane is straightforward to construct in the Cartesian coordinates. Other reference surfaces may be usable in other coordinate systems.

It is also appreciated that information about antennas may represent antenna locations or antenna site locations on the ground level. If it is assumed that the communications device is on the ground level, the antenna site information is typically used in calculating the altitude estimate for the communications device. If information about the sum of the antenna altitude a and antenna height h, it may be possible to estimate the antenna site altitude on the ground level before estimating the altitude for the communications device.

On the other hand, altitude estimation of a communications device may be based on true three-dimensional antenna locations above the ground level, not on antenna site locations on the ground level. For example, if it is known that all cells involved in the two-dimensional location estimate calculations or in the altitude estimation calculations relating to a communications device are indoor cells, the altitude estimation of the communications device may be based on the known true antenna locations, not on antenna locations on the ground level. Examples of indoor cells are, for example, cells in an office building or in a hospital. A communications system may store information relating to the type of the cells, and this information may comprise indication of a cell being an indoor cell or an outdoor cell. Such indication about indoor/outdoor cells may be used in the altitude estimation for a communications device.

Although preferred embodiments of the apparatus and method embodying the present invention have been illustrated in the accompanying drawings and described in the foregoing detailed description, it will be understood that the invention is not limited to the embodiments disclosed, but is capable of numerous rearrangements, modifications and substitutions without departing from the spirit of the invention as set forth and defined by the following claims.

The invention claimed is:

1. A method for estimating altitude of a communications device, comprising the step of:

estimating a two-dimensional location estimate of the communications device based on signal measurements relating to at least two antennas of a communications system; and estimating the altitude of the communications device based at least on altitudes of said at least two antennas of a communications system and on the two-dimensional location estimate of the communications device.

2. A method as defined in claim 1, further comprising a step of providing antenna information representing three-dimensional locations of said at least two antennas, the altitude estimation being based on said two-dimensional location estimate of the communications device and on said antenna information.

3. A method as defined in claim 1, wherein said signal measurements include at least one of the following: signal timing measurements, signal strength measurements and direction of arrival measurements.

4. A method for estimating altitude of a communications device, comprising the step of:
   estimating a two-dimensional location estimate of the communications device based on signal measurements relating to at least two antennas of a communications system and based on identity information of at least two cells corresponding to said at least two antennas of said communications system; and
   estimating the altitude of the communications device based at least on altitudes of said at least two antennas of said communications system and on the two-dimensional location estimate of the communications device.

5. A method as defined in claim 1, further comprising the step of estimating accuracy of the altitude estimate of the communications device.

6. A method as defined in claim 2, wherein the altitude estimation uses a weighted average of altitudes of said at least two antennas, each weight taking into account said two-dimensional location estimate of the communications device and a two-dimensional location of an antenna of said communications device.

7. A method as defined in claim 6, wherein each weight in the weighted average is inversely proportional to a distance between the two-dimensional location estimate of the communications device and the two-dimensional location of an antenna of said communications system.

8. A method as defined in claim 6, further comprising the step of estimating said two-dimensional location estimate for the communications device based on information relating to said at least two antennas of said communication system.

9. A method as defined in claim 8, further comprising the step of estimating accuracy of the altitude estimate of the communications device.

10. A method as defined in claim 2, wherein the altitude estimation is determined by projecting the two-dimensional location estimate of the communications device to a reference plane determined using said antenna information.

11. A method as defined in claim 10, wherein the reference plane intersects points defined by said antenna information.

12. A method as defined in claim 10, wherein the reference plane is a regression plane relating to points defined by said antenna information.

13. A method as defined in claim 10, further comprising the step of estimating said two-dimensional location estimate for the communications device based on information relating to said at least two antennas of said communication system.

14. A method as defined in claim 13, further comprising the step of estimating accuracy of the altitude estimate of the communications device.

15. A method as defined in claim 14, wherein the accuracy of the altitude estimate of the communications device is estimated using said reference plane.

16. A method as defined in claim 1, wherein said altitude of said at least one antenna represents said at least one antenna at a ground level.

17. A method as defined in claim 1, wherein said altitude of said at least one antenna represents said at least one antenna above a ground level.

18. A method for providing location assistance information to a communications device communicating with a communications system via at least two antennas of said communications system, said method comprising:
   estimating a two-dimensional location estimate of the communications device based on signal measurements relating to said at least two antennas of said communications system;
   estimating an altitude estimate of the communications device based at least on altitude information of said at least two antennas; and
   determining location assistance information based on the two-dimensional location estimate and the altitude estimate of the communications device.

19. A method as defined in claim 18, further comprising the step of estimating an accuracy of the altitude estimate, wherein the accuracy of the altitude estimate is included in the location assistance information.

20. A method as defined in claim 18, wherein said antenna information represents three-dimensional locations of said at least two antennas, the altitude estimation being based on said two-dimensional location estimate of the communications device and on said antenna information.

21. A method as defined in claim 20, wherein the altitude estimation uses a weighted average of altitudes of said at least two antennas, each weight taking into account said two-dimensional location estimate of the communications device and a two-dimensional location of an antenna of said communications device.

22. A method as defined in claim 20, wherein the altitude estimation is determined by projecting the two-dimensional location estimate of the communications device to a reference plane determined using said antenna information.

23. A communications system, said communications system comprising:
   first estimation means for estimating a two-dimensional location estimate of a communications device based on signal measurements relating to at least two antennas of said communications system;
   storage means for storing antenna information representing at least altitudes of said at least two antennas of said communications system; and
   second estimation means for estimating an altitude of said communications device based at least on said altitudes of said at least two antennas of said communications system and on the two-dimensional location estimate of the communications device.

24. A communications system as defined in claim 23, further comprising:
   determination means for determining location assistance information based on said two-dimensional location estimate and said altitude estimate of the communications device.

25. A communications system as defined in claim 23, wherein said antenna information represents three-dimensional locations of antennas of said communications system.

26. A communications system as defined in claim 25, further comprising:
   determination means for determining location assistance information based on said two-dimensional location estimate and said altitude estimate of the communications device.

27. A communications system as defined in claim 23, further comprising:
   third estimation means for estimating accuracy of said altitude estimate for a communications device.

28. A communications system as defined in claim 23, wherein the communications system comprises a cellular telecommunications system.

29. A network element for a communications system, said network element comprising:
- first estimation means for estimating a two-dimensional location estimate of a communications device based on signal measurements relating to at least two antennas of said communications system;
- first determination means for determining antenna information representing at least altitudes of said at least two antennas of said communications system; and
- second estimation means for estimating an altitude of the communications device based at least on said altitudes of said at least two antennas of said communications system and on said two-dimensional location estimate of the communications device.

30. A network element as defined in claim 29, further comprising:
- third determination means for determining location assistance information based on said two-dimensional location estimate and said altitude estimate of the communications device.

31. A network element as defined in claim 29, further comprising:
- wherein said antenna information represents three-dimensional locations of antennas of said communications system.

32. A network element as defined in claim 31, further comprising:
- third determination means for determining location assistance information based on said two-dimensional location estimate and said altitude estimate of the communications device.

33. A network element as defined in claim 29, further comprising:
- third estimation means for estimating accuracy of said altitude estimate for a communications device.

34. A network element as defined in claim 29, wherein the network element comprises a location server.

35. A network element as defined in claim 29, wherein the network element comprises a network element responsible for radio resource control of a cellular telecommunications network.

36. A computer readable medium containing executable computer program instructions which, when executed by a data processing system, cause said data processing system to perform a method comprising
- estimating a two-dimensional location estimate of the communications device based on signal measurements relating to at least two antennas of a communications system; and
- estimating an altitude of the communications device based at least on altitudes of said at least two antennas of a communications system and on the two-dimensional location estimate of the communications device.

37. A method for providing location assistance information to a communications device communicating with a communications system, said method comprising:
- estimating a two-dimensional location estimate of the communications device based on signal measurements relating to at least two antennas of a communications system;
- estimating an altitude estimate of the communications device based at least on altitude information of said at least two antennas of the communications system and on the two-dimensional location estimate; and
- determining location assistance information based on the two-dimensional location estimate and the altitude estimate of the communications device.

* * * * *